(12) United States Patent
Sayre et al.

(10) Patent No.: US 9,096,990 B2
(45) Date of Patent: Aug. 4, 2015

(54) HYDRAULIC FITTING FOR BULKHEAD MOUNTING WITH KEY SHAPED CROSS SECTION

(75) Inventors: Jeffrey Paul Sayre, Naperville, IL (US); Don Wesley Bomstad, Earlville, IL (US)

(73) Assignee: Caterpillar Inc., Peoria, IL (US)

( * ) Notice: Subject to any disclaimer, the term of this patent is extended or adjusted under 35 U.S.C. 154(b) by 805 days.

(21) Appl. No.: 13/326,986

(22) Filed: Dec. 15, 2011

(65) Prior Publication Data
US 2013/0153063 A1 Jun. 20, 2013

(51) Int. Cl.
| | | |
|---|---|---|
| A01G 25/09 | (2006.01) | |
| B60P 3/22 | (2006.01) | |
| B60P 3/30 | (2006.01) | |
| B60R 15/04 | (2006.01) | |
| E01H 1/10 | (2006.01) | |
| E01H 3/02 | (2006.01) | |
| F16L 3/04 | (2006.01) | |
| F16L 5/00 | (2006.01) | |
| F16L 27/00 | (2006.01) | |
| F16L 27/04 | (2006.01) | |
| F16L 41/04 | (2006.01) | |
| E02F 9/22 | (2006.01) | |
| F16L 5/12 | (2006.01) | |
| F16L 43/00 | (2006.01) | |

(52) U.S. Cl.
CPC ................. *E02F 9/2275* (2013.01); *F16L 5/12* (2013.01); *F16L 43/001* (2013.01)

(58) Field of Classification Search
CPC .......... E02F 9/2275; F16L 5/12; F16L 43/001
USPC ......... 137/899; 285/179, 139.1, 139.2, 139.3, 285/141.1, 143.1, 349, 390, 391, 330; 60/476
See application file for complete search history.

(56) References Cited

U.S. PATENT DOCUMENTS

| 7,597,361 | B2 * | 10/2009 | Theilen .......................... 285/206 |
|---|---|---|---|
| 2004/0244234 | A1 | 12/2004 | Underwood |
| 2005/0047899 | A1 * | 3/2005 | Sugimoto ...................... 414/724 |
| 2010/0201118 | A1 * | 8/2010 | Anton et al. ..................... 285/93 |

FOREIGN PATENT DOCUMENTS

| JP | 2002-013158 A | 1/2002 |
|---|---|---|
| JP | 2006-283527 A | 10/2006 |
| JP | 2010-285816 A | 12/2010 |
| KR | 20-1998-0026619 U | 8/1998 |

* cited by examiner

*Primary Examiner* — Craig Schneider
*Assistant Examiner* — Kelsey Rohman
(74) *Attorney, Agent, or Firm* — BakerHostetler

(57) ABSTRACT

A hydraulic fitting is used to fluidly connect hydraulic hoses on opposite sides of a bulkhead of a machine. The bulkhead is clamped between a flange of the hydraulic fitting and a nut. One set of threads of the hydraulic fitting is split by a flat surface to create a cross section with a key shape that is received in only one orientation through a matched key shaped mounting bore in the bulkhead. The key shape interaction prevents the hydraulic fitting from rotating when installed in the bulkhead.

17 Claims, 4 Drawing Sheets

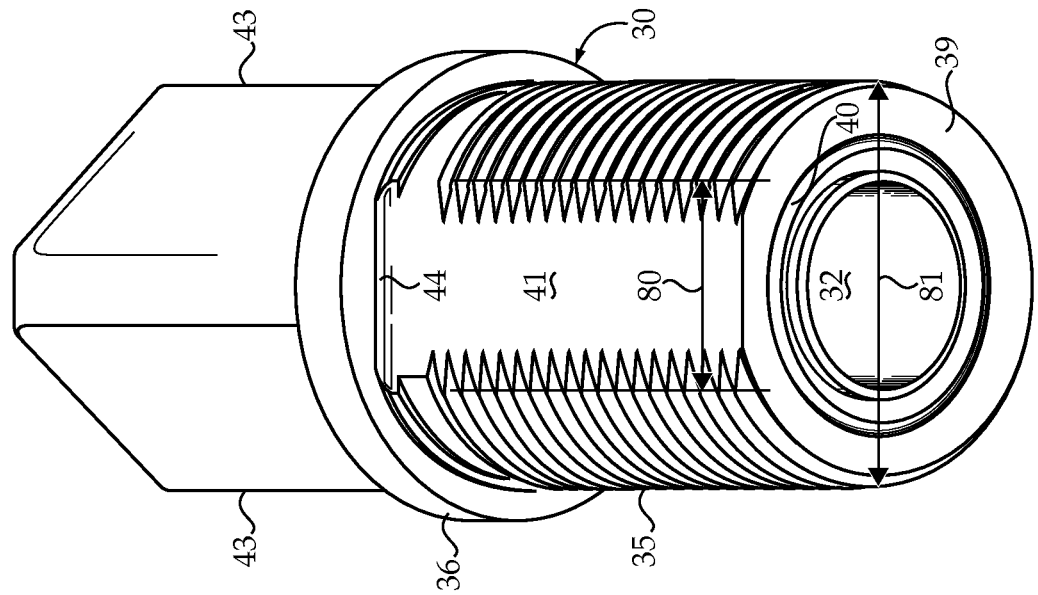
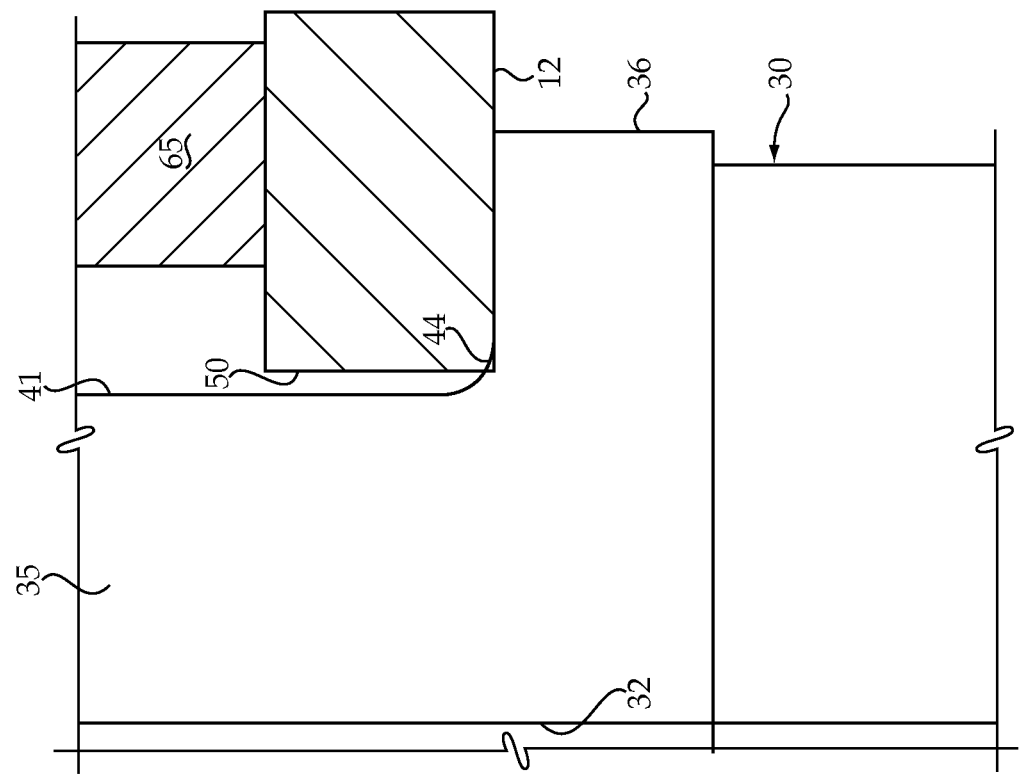

HYDRAULIC FITTING FOR BULKHEAD MOUNTING WITH KEY SHAPED CROSS SECTION

TECHNICAL FIELD

The present disclosure relates generally to hydraulic bulkhead fittings for connecting hydraulic hoses on opposite sides of a bulkhead, and more particularly to a key shaped hydraulic fitting and matching key shaped mounting bore of a bulkhead to prevent rotation during installation.

BACKGROUND

Many of today's modern machines, especially those used in the construction and mining industries, include a hydraulic system with one or more hydraulic actuators to move an implement. For instance, a wheel loader utilizes hydraulic cylinders to both raise and lower the bucket as well as rotate the bucket between dump and racked positions. Hydraulic fluid necessary to operate these implements often originates at one location on the machine and is moved out to the hydraulic actuator through hydraulic hoses. In many instances, the hydraulic fluid must pass through a bulkhead of the machine body, and may undergo a turn in direction when passing through that bulkhead. This type of fluid connection is often facilitated by mounting an elbow hydraulic fitting in the bulkhead and then connecting first and second hoses to opposite ends of the fitting on opposite sides of the bulkhead. This type of hydraulic connection typically utilizes o-ring face seals on each of the ports of the hydraulic fitting.

In the past, these hydraulic fittings typically included a circular cross section that was received through a circular mounting bore in the bulkhead. When the hydraulic elbow fitting facilitates a directional change, it is often necessary to hold the hydraulic fitting in a proper orientation with a wrench while threading a nut onto the fitting to clamp the bulkhead between the nut and a flange of the hydraulic fitting. Otherwise, the hydraulic fitting tends to rotate in the mounting bore, with the hydraulic elbow fitting pointing in a random direction when the nut is finally tightened. Because these hydraulic fittings are sometimes mounted in difficult to reach locations on a machine that also sometimes includes extremely tight spatial constraints, it is sometimes extremely difficult to not only get a wrench into a tight difficult to reach space envelope, but even more difficult in engaging the hydraulic fitting to hold the proper orientation of the fitting when the nut is tightened for installation in the bulkhead.

The present disclosure directed toward one or more of the problems set forth above.

SUMMARY

In one aspect, a machine includes a machine body with a bulkhead that is supported by a conveyance. A hydraulic system is attached to the machine body, is fluidly connected to a hydraulic actuator of an implement, and includes a plurality of hydraulic hoses and hydraulic fittings. Each of the hydraulic fittings has an integral metallic body that defines a fluid passage extending between a first port and a second port. The hydraulic fitting includes a long set of external threads extending between the first port and a flange, and a short set of external threads adjacent the second port. Each of the first port and second port are surrounded by a face seal that includes a planar surface and an o-ring groove with an o-ring received therein. The long set of external threads is split by a flat surface along a plane parallel to a long thread axis to produce a cross section with a key shape. The long set of external threads are received in a key shaped mounting bore through the bulkhead at a first hose angle orientation about the long thread axis. The bulkhead is clamped between the flange and a nut threaded onto the long set of external threads. A short thread axis is oriented at a second hose angle with respect to the long thread axis. A first hydraulic hose and a second hydraulic hose are threadably attached to the respective long set of external threads and the short set of external threads, and in sealing contact with the respective face seals.

In another aspect, a hydraulic hose fitting includes an integral metallic body that defines a fluid passage extending between a first port and a second port. A long set of external threads extends between the first port and a flange, and a short set of external threads are positioned adjacent the second port. Each of the first port and second port beings are surrounded by a face seal that includes a planar surface and defines an o-ring groove. The long set of external threads is split by a flat surface along a plane parallel to a long thread axis to produce a cross section with a key shape. A short thread axis is oriented at an elbow angle, which is greater than zero, with respect to the long thread axis. A ratio of a width of the flat surface to an outer diameter of the long set of external threads is about 0.5.

In still another aspect, a method of assembling a hydraulic system, which includes a hydraulic actuator, of a machine that has a machine body supported by a conveyance includes inserting a long set of external threads of a hydraulic fitting through a key shaped mounting bore of a bulkhead of the machine body. A nut is threaded onto the long set of external threads while keeping the hydraulic fitting from rotating about a long thread axis. The long set of external threads is split by a flat surface along a plane parallel to the long thread axis to produce a cross section with a key shape that matches the key shape mounting bore. The step of keeping the hydraulic fitting from rotating includes preventing rotation by an interaction between the cross section with the key shape and the key shape mounting bore. The bulkhead is clamped between a flange of the hydraulic fitting and a nut. A first hydraulic hose is threaded onto a short set of external threads of the hydraulic fitting until a face seal surface of the hydraulic hose contacts a face seal and o-ring of the hydraulic fitting. A second hydraulic hose is threaded onto the long set of external threads of the hydraulic fitting until a face seal surface of the second hydraulic hose contacts a face seal and o-ring of the hydraulic fitting. The first hydraulic hose and the second hydraulic hose are fluidly connected with a fluid passage extending between a first port and a second port of the hydraulic fitting. Hydraulic fluid is moved to or from the hydraulic actuator through the first hydraulic hose, the hydraulic fitting and the second hydraulic hose. Preventing rotation is balanced against avoiding leakage at the face seal adjacent the long set of the external threads during the moving step by setting a ratio of a width of the flat surface to an outer diameter of the long set of external threads to be about 0.5.

BRIEF DESCRIPTION OF THE DRAWINGS

FIG. 4 is an enlarged sectioned view through a portion of a hydraulic fitting attachment to a bulkhead of the machine of FIG. 1;

FIG. 5 is a top perspective view of a hydraulic fitting according to another aspect of the present disclosure.

DETAILED DESCRIPTION

Figure 1:
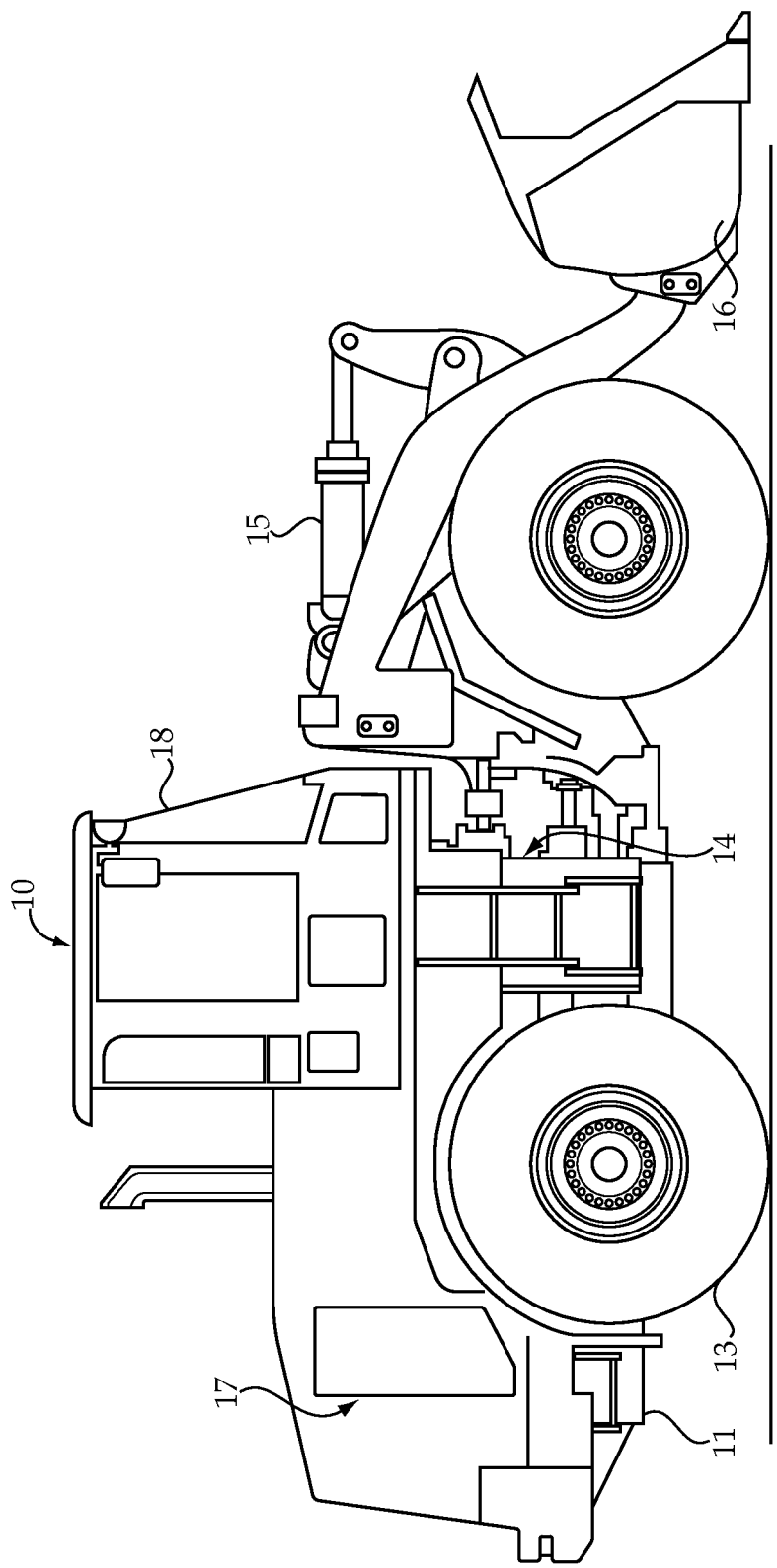
FIG. 1 is a side view of a machine according to one aspect of the present disclosure.
Figure 2:
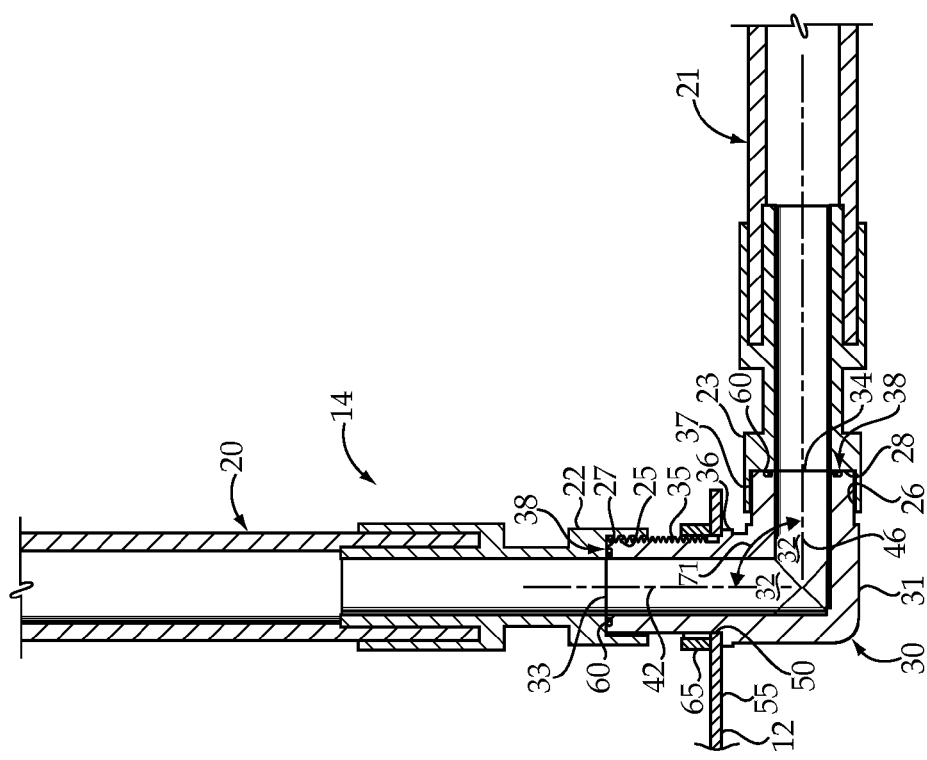
FIG. 2 is a sectioned view through a portion of a hydraulic system for the machine of FIG. 1.

Referring to FIG. 1, a machine 10 includes a machine body 11 supported by a conveyance 13. Machine 10 may include an operator station 18, an engine 17 and a hydraulic system 14 all attached to machine body 11. Hydraulic system 14 may be fluidly connected to a hydraulic actuator 15 of an implement 16. Although the machine 10 of the present disclosure is illustrated in the context of a wheel loader that actuates to tilt a bucket 16 with a hydraulic cylinder 15, those skilled in the art will appreciate that the concepts of the present disclosure can apply to a wide variety of machines with differing conveyances, alternate hydraulic actuators and different implements without departing from the present disclosure. For instance, a track type conveyance would also fall under the present disclosure. A hydraulic motor could be a hydraulic actuator according to the present disclosure, and many other implements including booms, buckets, brooms, hammers, etc. would all be considered implements according to the present disclosure. Referring in addition to FIG. 2, the hydraulic system 14 of machine 10 may include a plurality and hydraulic fittings 30 that each facilitate connection of a first hydraulic hose 20 to a second hydraulic hose 21 through a bulkhead 12, which can be considered a portion of machine body 11.

Hydraulic hoses 20 and 21 are conventional in that each include a connector 22, 23 at opposite ends and define a fluid passage therethrough. In many instances, the connectors 22 and 23 are metallic while the remaining portions of the hose 20, 21 may be made from some flexible material that can properly contain the pressure of the hydraulic fluid therein. Each connector 21, 23 includes a respective set of internal threads 25, 26 adjacent a respective face seal surface 27, 28. In the illustration of FIG. 2, the hydraulic fluid pathway defined by hoses 20 and 21 facilitates a 90° turn and passes through bulkhead 12 by way of hydraulic fitting 30. Hydraulic fitting 30 has an integral metallic body 31 that defines a fluid passage 32 extending between a first port 33 and a second port 34. Hydraulic fitting 30 includes a long set of external threads 35 extending between first port 33 and a flange 36, and a short set of external threads 37 adjacent the second port 34. Each of the first port 33 and the second port 34 are surrounded by a face seal 38 that includes a planar surface 39 and an o-ring groove 40 with an o-ring 60 received therein. First hydraulic hose 20 is threadably attached to a long set of external threads 35 so that face seal surface 27 is in contact with planar surface 39 pinching o-ring 60 therebetween to create a fluid tight seal. Likewise, second hydraulic hose 21 is threadably attached to the short set of external threads 37 so that face seal surface 28 is in contact with planar surface 39 and also pinches an o-ring 60 therebetween to create a fluid tight seal at port 34. The bulkhead 12 is clamped between the flange 36 and a nut 65 that is threaded onto the long set of external threads 35. In the illustrated embodiment, a short thread axis 46 is oriented at a hose or elbow angle 71 with respect to long thread axis 42. In the illustration, hose or elbow angle 71 is 90°, however, those skilled in the art will appreciate that fittings where the elbow angle is 45° or another non-zero angle, as well as those cases where long thread axis 42 is co-linear with short thread axis would also fall within the scope of the present disclosure.

Figure 3:
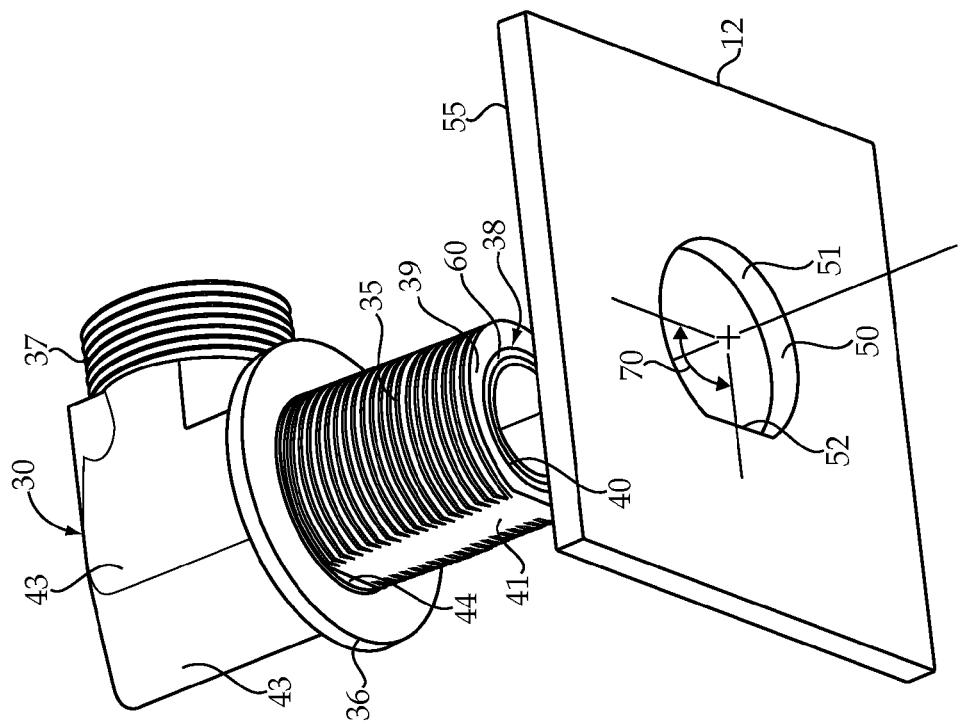
FIG. 3 is a perspective view of a hydraulic fitting being installed into a bulkhead of the machine body of FIG. 1.

Referring in addition to FIG. 3, fitting 30 is shown suspended in the air prior to installation through a key shaped mounting bore 50 defined by bulkhead 12. Key shaped mounting bore 50 has a predominantly circular portion 51 that is truncated by a chord 52. A portion of fitting 30 includes a key shape such that the long set of external threads 35 is split by a flat surface 41 along a plane parallel to the long thread axis 42 to produce a cross section with a key shape that matches that of key shaped mounting bore 50 with enough clearance that the fitting can be easily slid through bulkhead 12. However, the clearance between key shaped mounting bore 50 and the matched key shape produced by the long set of external threads and flat surface 41 may preferably not be so great as to allow a substantial amount of rotational movement about long thread axis 41 after fitting 30 has been mated through bulkhead 12. For instance, a radial clearance on the order of about +/−0.25 millimeters radially might be typical. The orientation of the key shaped mounting bore 50 may be defined by the orientation of chord 52, and may define a first hose angle 70 about long thread axis 42.

Referring in addition to FIG. 4, when fitting 30 is being manufactured, and flat surface 41 may be machined onto the integral metallic body 31, a transition volume 44 may be created between flat surface 41 and the bearing surface of flange 36. When nut 65 is tightened onto long set of external threads 35 as shown in FIG. 4, the transition zone 44 may be crushed between one side 55 of bulkhead 12 and the bearing surface of flange 36. The interaction between the crushing of transition zone 44 during the last turn of nut 65 when bulkhead 12 is clamped between nut 65 and flange 36 may help to inhibit rotation of fitting 30 in the key shaped fitting bore 50 when torques are at their highest. When torques are low when the nut 65 is being threaded onto the long set of external threads, the interaction between the flat surface 41 and the chord 52 may be sufficient to prevent rotation of fitting 30 in the key shaped mounting bore 50 to maintain a predetermined fitting mounting orientation consistent with that defined by the first hose angle 70 as shown in FIG. 3. In the event that there is too much radial clearance between fitting 30 and key shaped mounting bore 50, a wrench may be used in contact with wrench engagement surfaces 43 to maintain a proper orientation of fitting 30 when nut 65 is tightened to clamp bulkhead 12. Wrench engagement surfaces 43 may be located between flange 36 and the short set of external threads 37.

Figure 6:
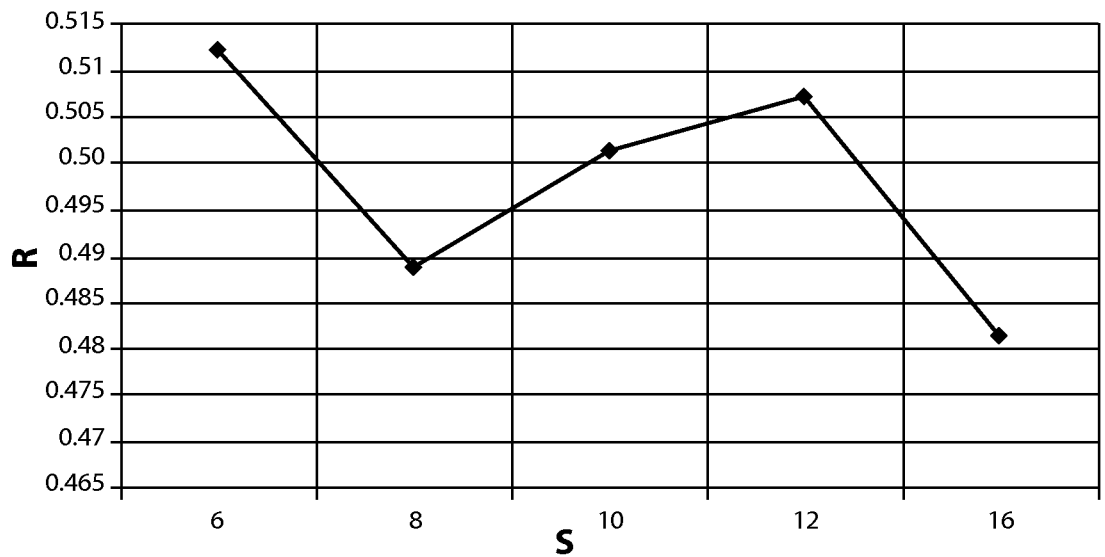
FIG. 6 is a graph of a ratio (R) of flat surface width to thread diameter verses fitting size S according to another aspect of the present disclosure.

Referring now in addition to FIGS. 5 and 6, some balancing of the geometry may be necessary to, on one hand, prevent rotation of fitting 30 in bulkhead 12, verses avoiding a leakage at the face seal 38 adjacent the long set of external threads 35. For instance, if the width 80 of flat surface 41 is made too small, the fitting begins to approach a circular cross section and begins to lose the advantages created by the mated key shapes. On the other hand, if the width 80 of flat surface 41 becomes too wide, that can undermine the width of planar surface 39 of face seal 38 leading to potential leakage out of the face seal adjacent the flat surface 41. A good balance between these competing characteristics may be to set a ratio of the width 80 of flat surface 41 to an outer diameter 81 of the long set of external threads 35 to be about 0.5. As used in this disclosure, the term "about 0.5" means a ratio between 0.4 and 0.6. The graph of FIG. 6 shows desirable ratios for fittings having dash sizes 6, 8, 10, 12 and 16. These dash sizes are based upon fluid line sizing at increments of a sixteenth of an inch. Thus, a dash 8 connector is for a half inch hose, and a dash 16 is for a one inch, etc. Favorable results appear to occur when the ratio is between 0.48 and 0.52, as shown in the graph of FIG. 6.

INDUSTRIAL APPLICABILITY

The present disclosure finds applicability to any machine that utilizes hydraulic hoses that need to pass fluid from one side to another of a bulkhead. The present disclosure finds particular applicability when the hoses need to undergo a change of direction via a hydraulic fitting when passing through the bulkhead. The present disclosure finds specific applicability in machines that utilize hydraulic systems for various implements and must plumb hydraulic fluid to a variety of locations on the machine utilizing hydraulic hoses and fittings that change direction and pass through bulkheads at various locations on the machine body. The present disclosure is specifically applicable to those cases in which fitting orientation is important and placement of a backup wrench to hold at orientation during nut tightening is difficult to accomplish. Thus, the present disclosure could find specific advantageous application by potentially eliminating the need for backup wrench to hold the orientation angle of the fitting at time of installation while also maintaining adequate torque retention to enable the use of power tools, such as an air gun, when tightening retaining nut 65.

During the assembly of hydraulic system 14 for machine 10, the long set of external threads 35 of a hydraulic fitting 30 are inserted through a key shaped mounting bore 50 in a bulkhead 12 of machine body 11. Preferably, the desired end orientation of the hydraulic fitting 30 is dictated by the orientation angle 70 of the key shaped mounting bore 50 through bulkhead 12 as best shown in FIG. 3. Also, by choosing the correct fitting 30, the elbow angle 71 between the long thread axis 42 and the short thread axis 46 can be correctly selected so that the appropriate length hydraulic hose can be utilized according to design criteria. For instance, the fitting may be straight, may have a 45° elbow, a 90° elbow or some other angle. Next, a nut 65 may be threaded onto the long set of external threads 35 while keeping the hydraulic fitting from rotating about long thread axis 42. For instance, the nut beginning threads may be initiated by hand holding the fitting and initiating the nut threading action with the other hand. Hand holding the fitting while initiating the nut thread may prevent the fitting from being pushed back out of the bulkhead 12, but the fitting is prevented from rotating via an interaction between the key shaped cross section of fitting 30 and the key shaped mounting bore 50. Next, the nut is tightened so that the bulkhead 12 is clamped between flange 36 and the nut 65. Preferably, this task may be accomplished by application of an air gun or draw down gun without any need for a wrench to prevent the fitting from rotating during the tightening process.

During the initial tightening of nut 65, the interaction between the flat surface 41 and the chord 52 may prevent rotation of fitting 30. As the nut draws down tighter, the transition zone 44 will interact with chord 52 and begin to become crushed between bulkhead 12 and flange 36 providing an elevated level of torque resistance when torques are high when the nut is finally being tightened. Next, a first hydraulic hose 20 is threaded onto the short set of external threads 37 until a face seal surface 27 contacts face seal 38 and o-ring 60 of hydraulic fitting 30. Next, a second hydraulic hose is threaded onto the long set of external threads 35 until face seal surface 28 contacts face seal 38 and o-ring 60 of the hydraulic fitting 30 at the second port 34. By doing so, the first hydraulic hose becomes fluidly connected to the second hydraulic hose by way of the fluid passage 32 extending between first port 33 and second port 34 of hydraulic fitting 30. When the complete hydraulic system 14 is assembled, hydraulic fluid is moved to or from the hydraulic actuator 15 through the first hydraulic hose 20, the hydraulic fitting 30, and the second hydraulic hose 21. Finally, preventing rotation is balanced against avoiding leakage at the face seal 38 adjacent the long set of external threads 35 during the hydraulic moving step by setting a ratio of a width 80 of flat surface 41 to an outer diameter 81 of the long set of external threads 35 to be about 0.5. Preferably, the rotation of the fitting 30 in the key shaped mounting bore 50 during the threading of nut 65 is accomplished without having to engage a wrench with the wrench engagement surfaces 43. In other words, most of the nut threading is preferably done with a power tool with a preset torque so that the fitting can be quickly tightened into a desired orientation by a quick application of a power tool after the nut 65 has been hand started onto the fitting 30.

The present disclosure has the potential for hastening the assembly of a hydraulic system 14 of a machine 10 that includes multiple fittings 30 with many that need to be clamped in certain orientations on the machine body 11 during assembly. By pre-orienting the key shaped mounting bores 50 of the orientation sensitive fitting locations, and by appropriately choosing the right elbow angle fittings, numerous fittings can be inserted and a nut started onto the long set of external threads 35. Next, an operator with a powered air gun or the like can move among numerous fittings tightening the respective nuts to a predetermined torque while doing so without the need for any wrench or other tool to hold the orientation of the fitting during the tightening procedure. This can especially hasten those instances where a wrench may be extremely difficult in a tight spatial envelope to get to the back side of the bulkhead to hold a fitting in a proper orientation during the tightening procedure. Furthermore, the construction of the present disclosure also permits proper orientation of the various fittings blindly. Thus, the costs associated with assembling a hydraulic system 14 for a machine 10 can be substantially reduced while at the same time raising certainty that all of the fittings 50 will be installed in the proper orientation as per design specifications.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine comprising:
   a machine body, which includes a bulkhead, supported by a conveyance;
   a hydraulic system attached to the machine body, fluidly connected to a hydraulic actuator of an implement, and including a plurality of hydraulic hoses and hydraulic fittings;
   each of the hydraulic fittings having an integral metallic body that defines a fluid passage extending between a first port and a second port, and including an long set of external threads extending between the first port and a flange, and a short set of external threads adjacent the second port;
   each of the first port and second port being surrounded by a face seal that includes a planar surface and an o-ring groove with an o-ring received therein;
   the long set of external threads being split by a flat surface along a plane parallel to a long thread axis to produce a cross section with a key shape, and being received in a mounting bore with the key shape through the bulkhead, and the key shape having a first hose angle orientation about the long thread axis;
   the bulkhead being clamped between the flange and a nut threaded onto the long set of external threads;

a short thread axis being oriented at a second hose angle with respect to the long thread axis; and a first hydraulic hose and a second hydraulic hose being threadably attached to the respective long set of external threads and the short set of external threads and in sealing contact with the respective face seal.

2. The machine of claim 1 wherein the flat surface has a width;

the long set of external threads has an outer diameter; and a ratio of the width to the outer diameter is about 0.5.

3. The machine of claim 2 wherein the ratio is between 0.48 and 0.52.

4. The machine of claim 1, wherein the short thread axis is oriented at the second hose angle with respect to the flat surface; and the second hose angle is forty five degrees or ninety degrees.

5. The machine of claim 1 wherein the hydraulic fitting includes a transition volume crushed between the flange and the bulkhead on a side of the bulkhead opposite to the nut.

6. The machine of claim 1 wherein the integral metallic body includes wrench engagement surfaces located between the flange and the short set of external threads.

7. The machine of claim 3 wherein the hydraulic fitting includes a transition volume crushed between the flange and the bulkhead on a side of the bulkhead opposite to the nut.

8. The machine of claim 7 the short thread axis is oriented at the second hose angle with respect to the flat surface;

the second hose angle is forty five degrees or ninety degrees; and the integral metallic body includes wrench engagement surfaces located between the flange and the short set of external threads.

9. A hydraulic hose fitting comprising:

an integral metallic body that defines a fluid passage extending between a first port and a second port, and including a long set of external threads extending between the first port and a flange, and a short set of external threads adjacent the second port;

each of the first port and second port being surrounded by a face seal that includes a planar surface and defines an o-ring groove;

the long set of external threads being split by a flat surface along a plane parallel to a long thread axis to produce a cross section with a key shape, wherein the cross section of the long set of external threads is configured to be received in a key shaped mounting bore formed through a bulkhead of a machine body;

a short thread axis being oriented at an elbow angle, which is greater than zero, with respect to the long thread axis; and a ratio of a width of the flat surface to an outer diameter of the long set of external threads is about 0.5.

10. The hydraulic fitting of claim 9 wherein the ratio is between 0.48 and 0.52.

11. The hydraulic fitting of claim 10 including an O-ring received in each of the o-ring grooves; and a nut threaded onto the long set of external threads.

12. The hydraulic fitting of claim 11 wherein the elbow angle is forty five degrees or ninety degrees; and the integral metallic body includes wrench engagement surfaces located between the flange and the short set of external threads.

13. The hydraulic fitting of claim 12 wherein the integral body includes a transition volume for crushing between the flange and the bulkhead when the hydraulic fitting is attached to the bulkhead.

14. A method of assembling a hydraulic system, which includes hydraulic actuator, of a machine that has a machine body supported by a conveyance, the method comprising the steps of:

inserting a long set of external threads of a hydraulic fitting through a key shaped mounting bore of a bulkhead of the machine body;

threading a nut onto the long set of external threads while keeping the hydraulic fitting from rotating about a long thread axis;

wherein the long set of external threads is split by a flat surface along a plane parallel to the long thread axis to produce a cross section with a key shape that matches the key shaped mounting bore;

wherein the step of keeping the hydraulic fitting from rotating includes preventing rotation by an interaction between the cross section with the key shape and the keyed shape mounting bore;

clamping the bulkhead between a flange of the hydraulic fitting and the nut;

threading a first hydraulic hose onto a short set of external threads of the hydraulic fitting until a face seal surface of the first hydraulic hose contacts a face seal and O-ring of the hydraulic fitting;

threading a second hydraulic hose onto the long set of external threads of the hydraulic fitting until a face seal surface of the second hydraulic hose contacts a face seal and O-ring of the hydraulic fitting;

fluidly connecting the first hydraulic hose to the second hydraulic hose with a fluid passage extending between a first port and a second port of the hydraulic fitting;

moving hydraulic fluid to or from the hydraulic actuator through the first hydraulic hose, the hydraulic fitting and the second hydraulic hose;

balancing the step of preventing rotation against avoiding leakage at the face seal adjacent the long set of external threads during the moving step by setting a ratio of a width of the flat surface to an outer diameter of the long set of external threads to be about 0.5.

15. The method of claim 14 wherein the clamping step includes crushing a transition volume of the hydraulic fitting between the bulkhead and the flange.

16. The method of claim 14 wherein the step of preventing rotation is accomplished without engaging a wrench with wrench engagement surfaces of the hydraulic fitting located between the flange and the short set of external threads.

17. The method of claim 16 wherein the clamping step includes crushing a transition volume of the hydraulic fitting between the bulkhead and the flange.

* * * * *